Patented May 15, 1934

1,959,283

UNITED STATES PATENT OFFICE 1,959,283

METHOD OF PREPARING PHENYL PHENOLS

Edgar C. Britton, Midland, Mich., assignor to The Dow Chemical Company, Midland, Mich., a corporation of Michigan No Drawing. Application March 2, 1931, Serial No. 519,692

12 Claims. (Cl. 260—154)

The present invention concerns methods for the preparation of phenols and particularly relates to methods for preparing phenyl phenols by hydrolyzing the corresponding mono-halo-diphenyls.

It has been thought heretofore that the alkaline hydrolysis of a halogenated aromatic hydrocarbon always yields the corresponding phenol, in which the hydroxy group occupies the same position as the halogen which it replaced. However, in my copending application, Serial No. 519,693, filed March 2, 1931, I have disclosed that this rule does not obtain in the case of mono-halogenated aromatic hydrocarbons in which the aromatic nucleus is substituted by another hydrocarbon group, i. e., an alkyl or aryl group. Examples of such substituted hydrocarbons are the chloro-toluenes and chloro-diphenyls. The hydrolysis of such compounds results in the formation of a mixture of isomeric phenols, instead of a single phenol corresponding to the halogenated hydrocarbon used in the reaction. Such mixtures of course require further treatment for separating the components, which is oftentimes a disadvantage when it is desired to produce only a single phenol product.

I have now found that such formation of mixtures of isomeric phenols may be prevented by carrying out the hydrolysis in the presence of catalytically active metallic copper or copper compounds, and in general at a lower temperature than that required in the absence of such catalyst. For example, when ortho-chlorodiphenyl is hydrolyzed by heating under pressure with an aqueous alkali at a temperature between 300° and 400° C., the reaction product contains a mixture of ortho-and meta-phenyl phenols. However, if the reaction is carried out in contact with a suitable copper containing catalyst, ortho-phenyl phenol alone is produced. The following description sets forth in detail the improved method constituting my invention, showing various ways in which the principle of the invention may be used.

In general, my invention may be carried out as follows:—Chlorodiphenyl, as representing a substituted halogenated aromatic hydrocarbon, is mixed with a moderate excess of aqueous sodium hydroxide of approximately 3 to 25 per cent strength, in a proportion of about 1.5 to 5 moles of said base per one mole of chlorodiphenyl, and the mixture heated under pressure in a suitable apparatus, e. g. an autoclave, bomb, or tubular autoclave system, at a temperature in general between about 250° and 350° C. for approximately one or two hours or more if necessary to obtain the desired conversion, such hydrolysis being preferably carried out in contact with extensive copper surfaces. The so obtained reaction mixture is then treated in any suitable way to isolate and recover the separate constituents thereof. For instance, the cooled or hot reaction mixture may be extracted with a water-immiscible solvent such as benzene, chlorobenzene, carbon tetrachloride, or equivalent thereof, to remove caustic-insoluble ethers formed as by-products in the reaction, i. e. di-diphenyl oxides, which may then be recovered by distillation of the solvent therefrom. The residual aqueous solution may then be treated to recover the phenyl phenol therefrom as such or in the form of a salt thereof, e. g. alkali-metal or alkali-earth metal salt. For instance, such aqueous solution may be acidified with any suitable acid, e. g. hydrochloric or sulfuric acid, and the thereby precipitated phenylphenol separated from residual liquors and fractionally distilled or otherwise purified.

Similar results can be obtained by hydrolyzing other substituted halo-hydrocarbons, such as chloronaphthalene, chlorotoluene, or the corresponding bromo compounds. Further, a mixture of such halogenated hydrocarbons, such as a mixture of mono-halogenated isomers obtained in the halogenation of a substituted hydrocarbon, e. g. a mixture of ortho- and para-chlorodiphenyls, can be hydrolyzed similarly in the presence of copper to form a mixture of the expected hydroxy compounds.

The following examples illustrate several ways of carrying out my invention.

Example 1

A charge of 1.6 moles of ortho-chlorodiphenyl, 3.2 moles of sodium carbonate, and 3.05 kilograms of water, was heated to 300° in a rotating copper bomb in one-half hour, and maintained at said temperature for two hours. The reaction mixture was removed from the bomb, acidified with hydrochloric acid, and the precipitate separated from residual liquors and then redissolved in sodium hydroxide solution. The alkaline solution was filtered from di-orthodiphenyl ether, and the aqueous alkaline filtrate acidified with hydrochloric acid, thereby precipitating ortho-phenylphenol which was separated therefrom and distilled under reduced pressure. In such manner there was obtained a 96 per cent conversion of chloro compound into hydroxy compound, and ortho-phenylphenol in approximately a 75 per cent yield of very pure product melting at 56.4° C.

The above ether, after one recrystallization from chlorobenzene, method at 116° C., and was obtained in a 73 gram yield.

Example 2

Similarly as in the above example, a mixture of 0.5 mole para-chlorodiphenyl, 1 mole of sodium carbonate, and 954 grams of water, was reacted in a rotating bomb with an electrically insulated internal copper cage therein, at 300° to 310° C. for five hours. The reaction mixture was worked up similarly, thereby obtaining a practically quantitative conversion, and an 83 per cent yield of substantially pure para-phenylphenol (m. p. 164° C.) and 10 grams of di-para-diphenyl ether.

Example 3

As above described, a charge of 0.366 mole of ortho-chlorodiphenyl, 0.73 mole of sodium carbonate, and 690 grams of water was reacted at 360° C. for one hour in an iron reactor internally coated with copper, thereby obtaining a 98 per cent conversion. Ortho-phenylphenol (m. p. 56.5° C.) was isolated in a 65 per cent yield. 12 grams of di-orthodiphenyl ether was obtained as a by-product.

Example 4

Similarly, 0.62 mole of ortho-chlorodiphenyl and 700 grams of 10 per cent aqueous sodium hydroxide solution was reacted at 350° to 360° C. for one-half hour in an iron reactor, internally copper-coated, a practically quantitative conversion being obtained. The isolated ortho-phenyl-phenol (freezing point of 58.5° C.) amounted to an 80 per cent yield.

Example 5

A charge of 1 mole of alpha-chloronaphthalene (containing 3 per cent of the beta modification), 3.2 moles of sodium carbonate, and 3.05 kilograms of water reacted at 300° C. for two hours in a copper reactor, thereby obtaining a 94.3 per cent conversion. The crude reaction product was acidified, the solids separated therefrom, and such solids fractionally distilled, thereby obtaining 60.2 grams of alpha-naphthol (97 per cent pure) and 64.7 grams of dinaphthyl ethers.

Example 6

A charge of 1.58 moles of para-chlorotoluene, 3.2 moles of sodium carbonate, and 3.05 kilograms of water was reacted at 300° C. for two hours in a copper reactor. The crude reaction mixture was acidified, extracted with benzene, and the extract distilled, thereby obtaining a 76 per cent yield of para-cresol (m. p. 34° C.) based on a 98.5 per cent conversion, and 20 grams of ether as a by-product.

As a hydrolytic agent for carrying out my above described improved hydrolytic method, there may be used an alkali-metal hydroxide, carbonate, or borate, or a mixture of two or more of such agents, or other equivalent thereof. The conditions for carrying out such hydrolysis, such as the temperature, duration of heating, concentration of hydrolytic base, etc., may be modified according to the halo-hydrocarbon to be reacted, e. g. chloro-naphthalene, chlorotoluene, or chlorocymene. In general, the hydrolysis begins at approximately 200° C. or slightly above, the reaction proceeding more rapidly with increasing temperature. The hydrolysis, which is quite apparent at about 250° C., becomes effectively useful at temperatures between approximately 275° and 350° C., higher temperatures usually being unnecessary. Furthermore, my present invention results in the formation of pure ethers as by-products, whereas by the ordinary hydrolysis of the starting materials, mixed ethers and a mixture thereof are obtained.

By the expression "copper-containing catalyst" in the claims, I mean a material acting catalytically in the herein described hydrolytic process, such material to include metallic copper, a copper compound, e. g. cuprous oxide, or a mixture of two or more of such components. Moreover, such catalytic material is to be present in an available form. For instance, if metallic copper is to be used as catalyst in a steel bomb, said metallic copper is to be electrically insulated therefrom to prevent deterioration or destruction of both the catalyst and the container, as disclosed in a co-pending application by John J. Grebe, Serial No. 446,679, filed April 23, 1930, Patent No. 1,814,796.

Other modes of applying the principle of my invention may be employed instead of those explained, change being made as regards the details herein disclosed, provided the details stated by any of the following claims or the equivalent thereof be employed.

I therefore particularly point out and distinctly claim as my invention:—

1. The method of making from a halogenated diphenyl a phenyl-phenol wherein the hydroxy group occupies the original position of the halogen, which comprises reacting such halogenated diphenyl with a hydrolytic agent under pressure in the presence of a copper-containing catalyst.

2. The method of making from a halogenated diphenyl a phenylphenol wherein the hydroxy group occupies the original position of the halogen, which comprises reacting such halogenated diphenyl with an aqueous hydrolytic agent from the group consisting of an alkali-metal hydroxide, carbonate, borate and mixtures of such agents, under pressure at a temperature of approximately 250° to 360° C. in the presence of a copper-containing catalyst.

3. The method of making from a chlorinated diphenyl a phenylphenol wherein the hydroxy group occupies the original position of the chlorine, which comprises reacting such chlorinated diphenyl with an aqueous alkali-metal base under pressure at a temperature of approximately 250° to 360° C. in the presence of copper.

4. The method of making from a chlorodiphenyl a phenylphenol wherein the hydroxy group occupies the original position of the chlorine, which comprises reacting such chlorodiphenyl with aqueous sodium hydroxide under pressure at a temperature of approximately 250° to 360° C. in the presence of copper.

5. The method of making ortho-phenylphenol which comprises reacting ortho-chlorodiphenyl with an aqueous hydrolytic agent under pressure at a temperature of approximately 250° to 360° C. in the presence of a copper catalyst.

6. The method of making ortho-phenylphenol which comprises reacting ortho-chlorodiphenyl with aqueous sodium hydroxide under pressure at a temperature of approximately 250° to 360° C. in the presence of metallic copper.

7. The method of making ortho-phenylphenol which comprises reacting ortho-chlorodiphenyl with a hydrolytic agent from the group consisting of an alkali-metal hydroxide, carbonate, borate and mixtures of such agents, in the presence of copper and separating ortho-phenylphenol from the crude reaction mixture.

8. The method of making para-phenylphenol which comprises reacting para-chlorodiphenyl with an aqueous hydrolytic base under pressure at a temperature of approximately 250° to 350° C., in the presence of a copper catalyst.

9. The method of making para-phenylphenol which comprises reacting para-chlorodiphenyl with aqueous sodium hydroxide under pressure at a temperature of approximately 250° to 350° C., in the presence of metallic copper.

10. The method of making para-phenylphenol which comprises reacting para-chlorodiphenyl with a hydrolytic agent from the group consisting of an alkali-metal hydroxide, carbonate, borate and mixtures of such agents, in the presence of copper and separating para-phenylphenol from the crude reaction mixture.

11. The method of making ortho- and para-phenylphenols which comprises reacting a mixture of ortho- and para-chloro-diphenyls with a hydrolytic agent from the group consisting of sodium hydroxide, carbonate, borate and mixtures of such agents, under pressure at a temperature between 250° and 350° C., and in the presence of copper.

12. The method of making ortho- and para-phenylphenols which comprises reacting a mixture of ortho- and para-chloro-diphenyls with aqueous sodium hydroxide under pressure at a temperature between 250° and 350° C., and in the presence of copper, and separating ortho- and para-phenylphenols from the crude reaction product.

EDGAR C. BRITTON.